Dec. 4, 1962 P. BURO 3,067,317
SPARK DISCHARGE ELECTRO-EROSION APPARATUS
Filed Dec. 1, 1959 4 Sheets-Sheet 1

INVENTOR
*PAUL BURO*

BY
*Frank R. Trifari*
AGENT

Dec. 4, 1962 P. BURO 3,067,317
SPARK DISCHARGE ELECTRO-EROSION APPARATUS
Filed Dec. 1, 1959 4 Sheets-Sheet 2
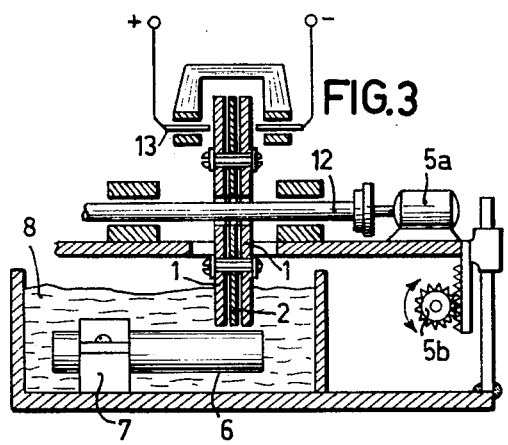
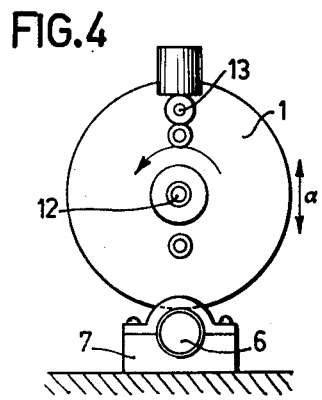
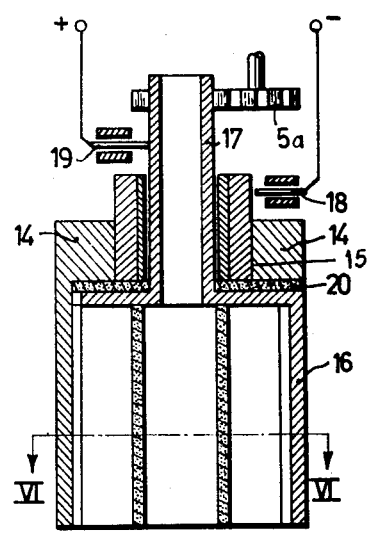
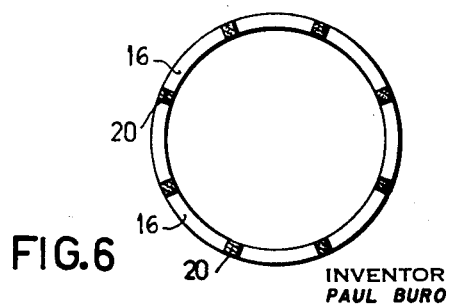
INVENTOR
PAUL BURO
BY
AGENT Dec. 4, 1962 P. BURO 3,067,317
SPARK DISCHARGE ELECTRO-EROSION APPARATUS
Filed Dec. 1, 1959 4 Sheets-Sheet 3

INVENTOR
PAUL BURO

BY
AGENT

Dec. 4, 1962  P. BURO  3,067,317
SPARK DISCHARGE ELECTRO-EROSION APPARATUS
Filed Dec. 1, 1959  4 Sheets-Sheet 4

INVENTOR
PAUL BURO

BY
AGENT

United States Patent Office 3,067,317
Patented Dec. 4, 1962

3,067,317
SPARK DISCHARGE ELECTRO-EROSION
APPARATUS
Paul Buro, Hamburg, Germany, assignor to North American Philips Company Inc., New York, N.Y., a corporation of Delaware
Filed Dec. 1, 1959, Ser. No. 856,582
Claims priority, application Germany Dec. 20, 1958
9 Claims. (Cl. 219—69)

For the manufacture of semi-conductor devices use is made of thin, semi-conductive wafers, which are usually sawed by means of very thin and hence readily deformable blade saws from rod-shaped and plate-shaped semi-conductive crystals. This has the disadvantage that the very brittle and hard semi-conductive substance breaks off at at a small deformation of the saws.

The spark discharge electro-erosion method is known for working metal work pieces, which serve as electrodes. Since this method requires a good conductivity of the work pieces in order to obtain satisfactory results, this method is apparently not suitable for cutting semi-conductive substances.

Moreover, the passing current would heat the semi-conductive materials to an inadmissibly high value, which would give rise to unwanted alterations in the semi-conductive material. When using the known method use must, moreover, be made of high voltages which are controlled only with difficulty.

It is already known to perforate a dielectric material arranged in the air gap between two electrodes by means of separate spark discharges. However, this known method is also not suitable for working semi-conductive material owing to the high voltages employed.

The invention is based on the recognition of the fact that the prevailing difficulties can be avoided by using at least two electrodes arranged at a short distance from each other. Since in this case the electrical resistance of the current path in the semi-conductive material is low, use may be made of low voltages. Moreover, the work piece is heated only partly since in practice only that portion of the semi-conductive material conveys current which is removed and forms the waste material.

In accordance with the invention, low-conductivity materials are worked, for example, disintegrated, particularly semi-conductive materials, by means of spark discharge electro-erosion by a method in which a fluid dielectric is used with two or more electrodes of different polarities, the minimum distance between them being chosen so that it is not materially larger than the sum of the two spark gaps between the electrodes and the work piece, and at least one electrode is moved relatively to the work piece.

The method according to the invention permits in a very simple manner of disintegrating semi-conductive materials and has the important advantage that the wafers to be disintegrated are subjected, during processing, to a very low lateral load.

The method and the device used for carrying it out are suitable not only for disintegrating semi-conductive materials. Without the need for further means, the method may provide, in addition, depressions in the form of cavities or grooves. If a larger quantity of material is removed from the surface of a work piece, elevations and ribs may be formed. In the case of plate-shaped work pieces, these surface formations may, moreover, be provided on both sides.

The invention will now be described more fully with reference to embodiments shown in the drawing.

FIGS. 3 and 4 show a device comprising rotating, adjacent electrodes also in a front view and a side view.

FIGS. 5 and 6 show a cylindrical device in a sectional view and a bottom view respectively.

Figure 1:
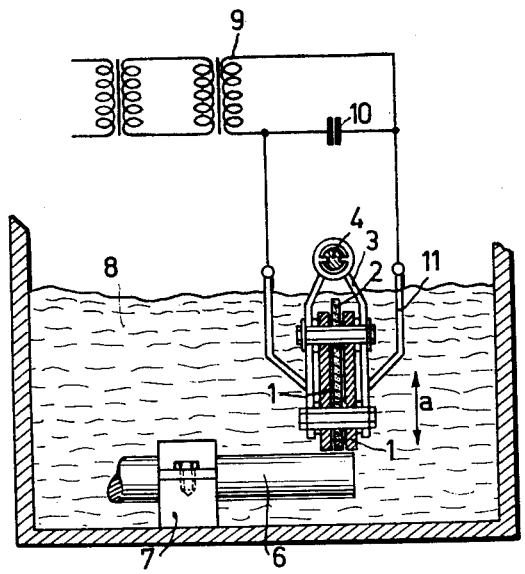
FIGS. 1 and 2 show a device for carrying out the method according to the invention, comprising adjacent, elongated, displaceable electrodes, in diagrammatic front and side views respectively.
Figure 2:
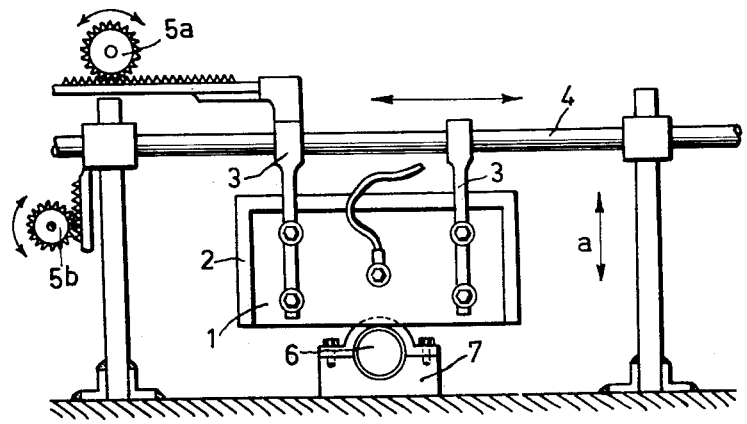

Two molybdenum, adjacent electrode plates 1 of for example 0.15 mm. in thickness, shown in FIGS. 1 and 2, are insulated from each other by means of an intermediate mica layer 2 and assembled by screws to form a packet. The electrode packet is secured to supports 3, which are adapted to be displaced along rails 4.

This arrangement permits a displacement of the electrode packet in the direction of their length. To this end one of the supports 3 is provided with a drive 5a, by which the electrode packet can move continuously to and fro. The bottom sides of the electrodes are moved during the rocking motion over a rod-shaped semi-conductive work piece 6.

A drive 5b, shown in FIG. 2, provides automatically a displacement of the electrode packet in the direction of the arrow a at right angles to the work piece 6 and keeps constant the most efficient value of the spark gap between the electrodes 1 and the work piece 6.

The work piece 6 is held in a support 7 in the position desired for cutting. The assembly is surrounded by a dielectric liquid, for example, transformer oil 8. Instead of using the dielectric liquid, use may be made of compressed gases. These media may be caused to flow at the working spot for the material 6.

The sparks are produced by using, for example, a transformer 9. The energy accumulated by a capacitor 10 during the halfwaves is fed to the electrode plates 1 via supply wires 11. The voltage is adjusted so that spark discharges occur not until the electrodes 1 have arrived near the work piece 6. Since the electrodes are near each other, the spark path or the path of the current passage through the semi-conductive work piece is short, so that the developed heat is only low and only there where the work piece is eroded away.

It has been found that in the spark gap only a very slight combustion of the disintegrated semi-conductive material occurs, since a large number of material particles can be regained from the transformer oil surrounding the device. Apparently, the disintegration occurs mainly by strong erosive forces during the spark discharges.

FIGS. 3 and 4 show a variant of the device shown in FIG. 1. The electrodes 1, separated by the intermediate mica layer 2, are shaped in the form of wafers. Through the centre of the electrode packet is taken a shaft 12, driven by a drive 5a; the edges of the electrode wafers 1 are continuously turned past the semi-conductive work piece 6. The voltage applied to the electrodes is fed via sliding contacts 13. Similarly to the device shown in FIGS. 1 and 2, the distance between the electrodes and the work piece in this device is adjusted by an automatically operating drive 5b.

In order to obtain particularly narrow gaps, it is important to choose an advantageous ratio between the conductivity of the semi-conductive material, the voltage applied, the width of the insulating intermediate layer between the electrodes and the width of the electrodes. It has been found to be particularly advantageous to choose a distance between the electrodes which slightly exceeds the sum of the spark paths between the electrodes and the semi-conductive work piece. With a voltage of 120 to 160 v., for example, an electrode spacing and an electrode width of 0.15 mm. were chosen. When using lower voltages or if the separating gaps obtainable at the given dimensions are too wide, the electrode distance and the electrode width may be considerably smaller.

In order to obtain narrow separating gaps or grooves, use may particularly be made of devices in which the spark paths extend between a plurality of series-connected electrodes of alternating polarities and along the desired cutting lines.

FIGS. 5 and 6 show a cylinder 14, which is provided with recesses 15, in which the corresponding cylinder segments 16 are arranged. The segments are secured to a bored rod 17, which is taken through the head of the cylinder. The cylinder 14 is connected via a sliding contact 18 to a terminal of the capacitor 10 and the segments 16 obtain a voltage via a sliding contact 19. The boundaries of the device are thus formed by electrodes of alternating polarities.

The gaps between the cylinder segments of different polarities are filled out with an insulating mass 20, for example, of synthetic substance. The device is rotated by a drive 5a, actuating rod 17 and conveyed by means of a further, preferably automatic drive (not shown) so near the semi-conductive work piece that spark discharge can occur between the cylinder segments.

By means of this device semi-conductive wafers are cut off cleanly from plate-shape semi-conductive crystals.

Figure 7:
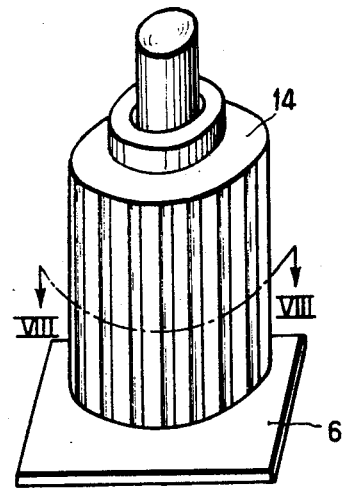
FIGS. 7 and 8 show such a device in a perspective view and in a bottom view.
Figure 8:
Figure 9:
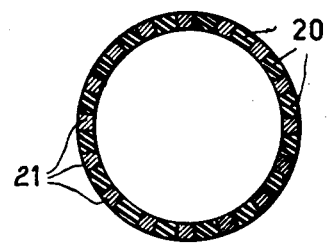
FIG. 9 shows a variant of such a device.

A variant of this device, which may be used for many purposes, is shown in FIGS. 7 to 9. The segments of the cylinder 14 are subdivided further in this case. As separate electrodes are used wires 21, having a circular (FIG. 8) or angular (FIG. 9) profile, of which the ends point towards the work piece 6.

Figure 10:
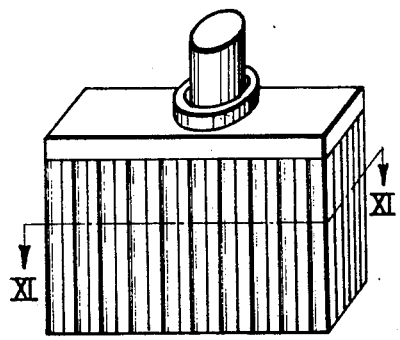
FIGS. 10 and 11 show a waffle-like arrangement of electrodes.
Figure 11:
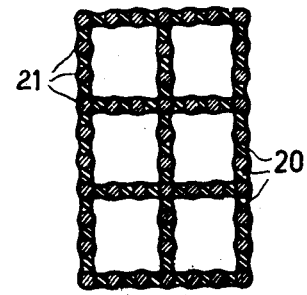

Also in this embodiment electrodes of alternating polarities are arranged side by side. The electrodes are also embedded in an insulating mass 20. The spark paths in this device are located so near side by side that without turning the device a semi-conductive wafer can be cut off the work piece. This permits of manufacturing semi-conductive wafers of any shape. FIGS. 10 and 11 show a modification in which the electrodes 21, embedded in an insulating mass 20, form a waffle-like arrangement.

By means of different electrode arrangements operating on the same principle the semi-conductive material is conducted away only partly, so that in accordance with the requirements, depressions may be made in the work piece or elevations may be formed on the work piece by removing material.

Apart from the versatile possibilities for use of the more closely adjacent spark paths, the method provides, moreover, a more uniform severing of the material. As in the arrangements described so far, the spark discharges occur, when the electrode arrangement is moved towards the work piece, only, where the distance between the electrodes of different polarities and the work piece is at a minimum. After a given number of discharges the distance is enlarged, owing to the removal of material, to an extent such that no further discharges can take place. When the arrangement is then moved nearer the work piece, again a series of discharges occurs at any place at the minimum distance between the electrodes and the work piece. This process is repeated until the desired semi-conductive wafer has its desired finish. The insulating material between the electrodes must be such that it burns away with the same velocity as the electrode to be used.

In order to obtain an optimum cooling of the electrodes, the outer edges thereof are not insulated. If for example through the hollow rod 17 the transformer oil serving as a dielectric or the gas is conveyed, this is conducive to the cooling.

Figure 12:
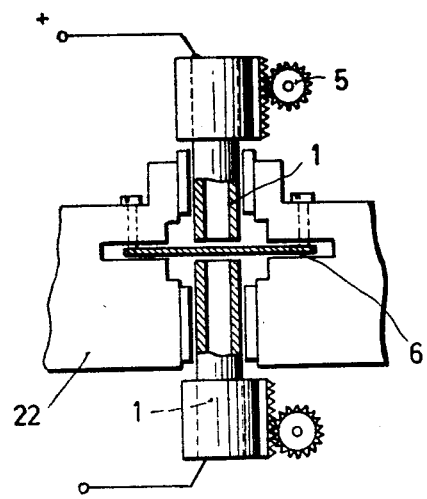
Figure 13:
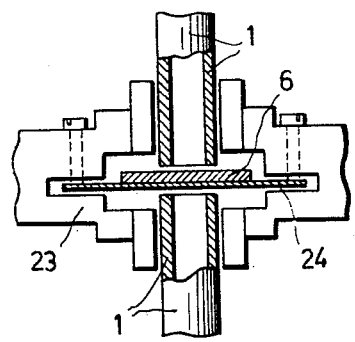
Figure 14:
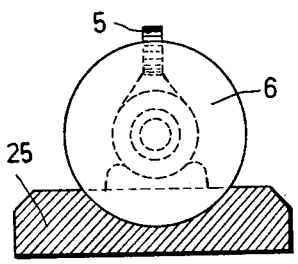
Figure 15:
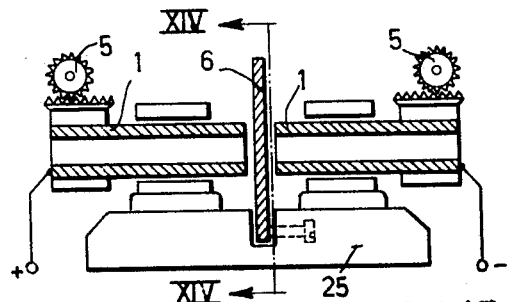

Thin, plate-shaped semi-conductive work pieces of, for example, 0.4 mm. in thickness, may also be worked by means of the devices shown in FIGS. 6 to 9, in which the, for example, tubular electrodes 1 (FIGS. 12 to 15) are arranged on either side of the work piece 6, with respect to which they can be displaced by means of drives 5. In the device shown in FIG. 12 the semi-conductive work piece 6 is fastened horizontally in a clamping device 22. Instead of using the clamping device 22, use may be made, without the need for further means, of a fastening by means of reduced pressure (vacuum), which has the particular advantage that the work piece can be readily detached, so that it can be readily exchanged. As shown in FIG. 13 the work piece 6 is stuck to a foil 24, secured in the clamping device 23, by means of a conductive adhesive. Also of this device variants may be manufactured, in which, for example, a plurality of wafer-shaped semi-conductive work pieces 6 are stuck in one row to a foil-shaped belt, which conveys these work pieces one after the other stepwise with time intervals corresponding to the time required for working the semi-conductive plate, between the electrodes. There is furthermore a possibility of clamping the work pieces in the manner shown in FIGS. 14 and 15 in vertical position with the aid of a clamp 25, the electrodes 1 having to be moved in a horizontal direction.

Figure 16:
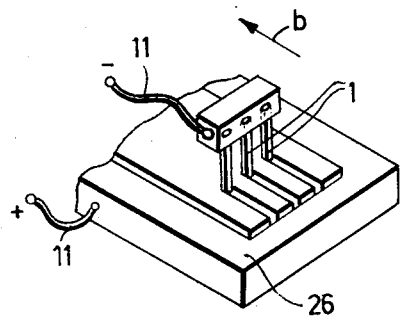
FIGS. 12 to 16 show devices having electrodes arranged on either side of the work piece and the various fastening means for the work piece.

Finally, as in the device shown in FIG. 16, the work piece 6 may be secured to a carrier 26, which operates itself as an electrode. This electrode serves in this case as a support for the work piece. A plurality of electrodes 1 of opposite polarity are then moved over the work piece by a member (not shown) in the direction of the arrow b; the sparks occurring between the moving electrodes and the semi-conductive work piece then remove material from the work piece. The distance between the moving electrodes and the work piece is also in this case kept constant automatically by means of a device not shown in the drawing.

What is claimed is:

1. Spark-discharge electro-erosion apparatus comprising means for supporting a low-conductivity work-piece, electrode means comprising a pair of spaced and insulated electrode members positioned adjacent the same side of the work-piece and defining spark gaps therewith, said electrode members being spaced apart a distance at least equal to the sum of the spark gaps of each member to the work-piece whereby the discharge current is confined to portions of the work-piece that are eroded away preventing deleterious heating of the surrounding work-piece portions, a fluid dielectric at the spark gaps, and means for moving the electrode means and work-piece relative to one another.

2. Apparatus as set forth in claim 1 wherein a mica plate having a thickness of no more than 0.15 mm. separates the electrode members.

3. Apparatus as set forth in claim 1, wherein the electrode members are plate shaped.

4. Apparatus as set forth in claim 3, wherein the members are circular discs, and means are provided for rotating the said discs.

5. Spark-discharge electro-erosion apparatus comprising means for supporting a semiconductive work-piece, electrode means comprising a pair of spaced and insulated electrode members positioned adjacent the work-piece and defining spark gaps therewith, said electrode members being spaced apart a distance slightly exceeding the sum of the spark gaps of each member to the work-piece whereby the discharge current is confined to portions of the work-piece that are eroded away preventing deleterious heating of the surrounding work-piece portions, a fluid dielectric at the spark gaps, means for moving the electrode means and work-piece relative to one another, and means for establishing a relatively low potential difference between the electrode members.

6. Apparatus as set forth in claim 5 wherein the electrode means comprises electrode members embedded in an insulating material.

7. Apparatus as set forth in claim 5 wherein the electrode members are arranged on opposite sides of the work piece.

8. Apparatus as set forth in claim 5, wherein the electrode means is hollow.

9. Apparatus as set forth in claim 5, wherein one member is fixed and on one side of the work-piece, and the other member is movable and on the other side of the work-piece.

References Cited in the file of this patent

UNITED STATES PATENTS

| | | |
|---|---|---|
| 2,569,414 | Godley et al. | Sept. 25, 1951 |
| 2,628,330 | Williams | Feb. 10, 1953 |
| 2,815,435 | Adcock | Dec. 3, 1957 |
| 2,901,588 | McKechnie | Aug. 25, 1959 |
| 2,920,180 | Ullmann et al. | Jan. 5, 1960 |
| 2,939,941 | Heerschap et al. | June 7, 1960 |
| 2,974,215 | Inoue | Mar. 7, 1961 |

FOREIGN PATENTS

| 768,230 | Great Britain | Feb. 13, 1957 |